United States Patent

Rubin

[15] 3,647,979

[45] Mar. 7, 1972

[54] PROGRAM STORE ERROR DETECTION ARRANGEMENTS FOR SWITCHING SYSTEMS

[72] Inventor: Harvey Rubin, New York, N.Y.

[73] Assignee: Bell Telephone Laboratories, Incorporated, Murray Hill, N.J.

[22] Filed: Jan. 13, 1970

[21] Appl. No.: 2,542

[52] U.S. Cl. ..................179/18 ES, 179/175.2 R, 340/172.5

[51] Int. Cl. ..........................................................H04q 3/54

[58] Field of Search...........179/7 MM, 18 EB, 18 ES, 18 EA, 179/27 G, 175.2 R, 175.2 C; 340/172.5

[56] References Cited

UNITED STATES PATENTS 3,495,220 2/1970 Lawson et al.......................340/172.5

*Primary Examiner*—Kathleen H. Claffy
*Assistant Examiner*—Thomas W. Brown
*Attorney*—R. J. Guenther and James Warren Falk

[57] ABSTRACT

A switching system includes a common control store having a plurality of circuit control registers which registers are arranged on a plurality of linked lists. Registers on different lists are linked together to control the operation of related circuits. Upon the detection of a linked register error, the detected register is removed from the lists and the codes contained therein are altered to ignore references thereto. The detected register is placed on an isolation list for a predetermined time during which time processing and store references to the detected register are deleted from the store. After the predetermined time the codes of the detected register are then altered to correspond to an idle state.

11 Claims, 14 Drawing Figures

Patented March 7, 1972 3,647,979

10 Sheets-Sheet 1

INVENTOR
H. RUBIN
BY
J. S. Cubert
ATTORNEY

Patented March 7, 1972

3,647,979

10 Sheets-Sheet 4

PROGRAM STORE ERROR DETECTION ARRANGEMENTS FOR SWITCHING SYSTEMS

BACKGROUND OF THE INVENTION

My invention is related to information-processing storage arrangements, more particularly to a storage arrangement wherein an error in a portion of a store does not prevent continued operation of the system, and more particularly to such a storage arrangement in a common control switching system.

In some types of information-processing systems and especially in real time processing systems, the system store contains a plurality of items each of which may be assigned to an associated external device. The items are arranged into a plurality of lists which lists relate to control functions of the system. Where several external devices are interconnected and jointly operated, the assigned items are advantageously linked to each other whereby the operation of the interconnected external devices are coordinated. A set of instructions in the store sequentially operates on the stored lists through the processor logic of the system to modify the codes in the items so that each group of assigned devices is operated in accordance with the desired system function. The state of the assigned item controls the associated device. In this way the high speed and versatility of the information-processing system can be utilized to control a plurality of complex processes operating in real time.

An electronic common control switching system is an example of a real time processing arrangement wherein several types of circuits, e.g., trunks, outpulsers, dialing receivers, etc., are interconnected and operated under the control of a central processor whereby a plurality of calls may be concurrently serviced. In one such switching system, a register in the common store is assigned to each circuit and the registers are arranged on linked lists according to the current register functions. One such list may provide timing for a call; another such list may provide queueing for one of a plurality of call processing functions; and yet another list may service outpulsing of dialing digits; and yet another list may consist of idle registers. Since a plurality of different types of switching circuits are associated with each call connection, their assigned registers are linked together during the call connection. In this way, the operations of the circuits assigned to the registers are coordinated. The assigned registers are coupled to their associated circuits through the processor so that the processor controls the coordinated circuit operations.

An error in a register, an inconsistency in the linkage of a register to a linked list or an inconsistency in the linkage between the registers assigned to a call connection may affect a plurality of the calls currently being processed. An arrangement is provided to periodically check for register errors or inconsistencies by means of auditing programs contained in the store. Priorly, a register error or inconsistency has been corrected by initializing a major portion of the store. This process however may affect all call connections in the system and the resulting interruption can seriously impair the operation of the entire switching system. Where only a few registers service a large group of subscriber stations, such as is the case in a local office, the store reconstruction may not affect many stations. In a traffic service position switching system wherein operator positions are connected to subscribers, however, each trunk connection to the traffic service position system has a corresponding dedicated register and a major store reconstruction could affect a large number of subscribers currently being serviced by the switching system.

BRIEF SUMMARY OF THE INVENTION

My invention is an arrangement for removing distinct items from a plurality of linked items in the active portion of the store of an information-processing system. Upon identification of a distinct item, the identified item is disassociated from the plurality of linked items and the identified item is altered to ineffectuate processing references thereto. The identified item is then isolated in the store for a predetermined time, during which time references from the store to the identified item are removed. The identified item is then modified to put it into an initial state.

According to one aspect of my invention, each of the plurality of linked items is assigned to a peripheral device of the processing system, whereby each peripheral device is controlled by its assigned item. Upon detection of an error in a particular item, the detected item is disassociated from the plurality of linked items and the code of the detected item is altered to render processing references thereto ineffective. The detected item code is then further altered to link the detected item to an isolated portion of the store for a predetermined time. During this predetermined time, store references to the detected item are deleted. The detected item code is then modified to correspond to an initial state whereby the assigned device is placed in an idle condition.

According to yet another aspect of my invention, the plurality of linked items comprise a group of linked items assigned to associated peripheral devices whereby the operations of said associated peripheral devices are coordinated. The plurality of linked items further comprises a group of linked item lists each arranged to process a plurality of items having similar functions. Upon detection of an error in an item, a first code in the detected item is altered to disassociate it from said plurality of linked item lists. A second code of the detected item is then altered to prevent processing references thereto. The disassociated detected item is then linked to an isolation list inaccessible to item list processing for a predetermined time during which time store references to said detected item are removed. After said predetermined time, the detected item codes are modified whereby the assigned circuit is put into an idle condition and said detected item is made available to the processing system.

In an illustrative embodiment of my invention, a common control is used to control the operation of a switching system having a plurality of switching circuits. The store comprises a plurality of multicode registers each of which is assigned to control a distinct switching circuit. A group of registers assigned to circuits involved in a distinct call connection are linked together. The plurality of registers are arranged into linked lists according to circuit function. The common control processor periodically checks the registers of the store and processes the linked lists whereby the states of the assigned switching circuits are controlled. Upon the detection of an error in a register, an addressing code of the detected register is altered to unlink the detected register from the plurality of register lists. Where there is a defect in the group of associated registers, the linkages from the detected register to the other registers in the group is broken. A status code in the detected register is then altered to render processing references to the detected register ineffective. The register addressing code is then altered so that the register is linked to an isolation list for a predetermined time. During this predetermined time the store is searched for references to the detected register and all such references are deleted. After the predetermined time, the detected register codes are modified whereby the assigned circuit is placed in an idle condition. If the group of associated registers is still linked to the detected register, they are also initialized. The placement of the detected register on an isolation list advantageously prevents alterations to the register and its assigned circuit so that store and processing references thereto cannot affect the operation of the assigned circuit.

DETAILED DESCRIPTION

Figure 1A:
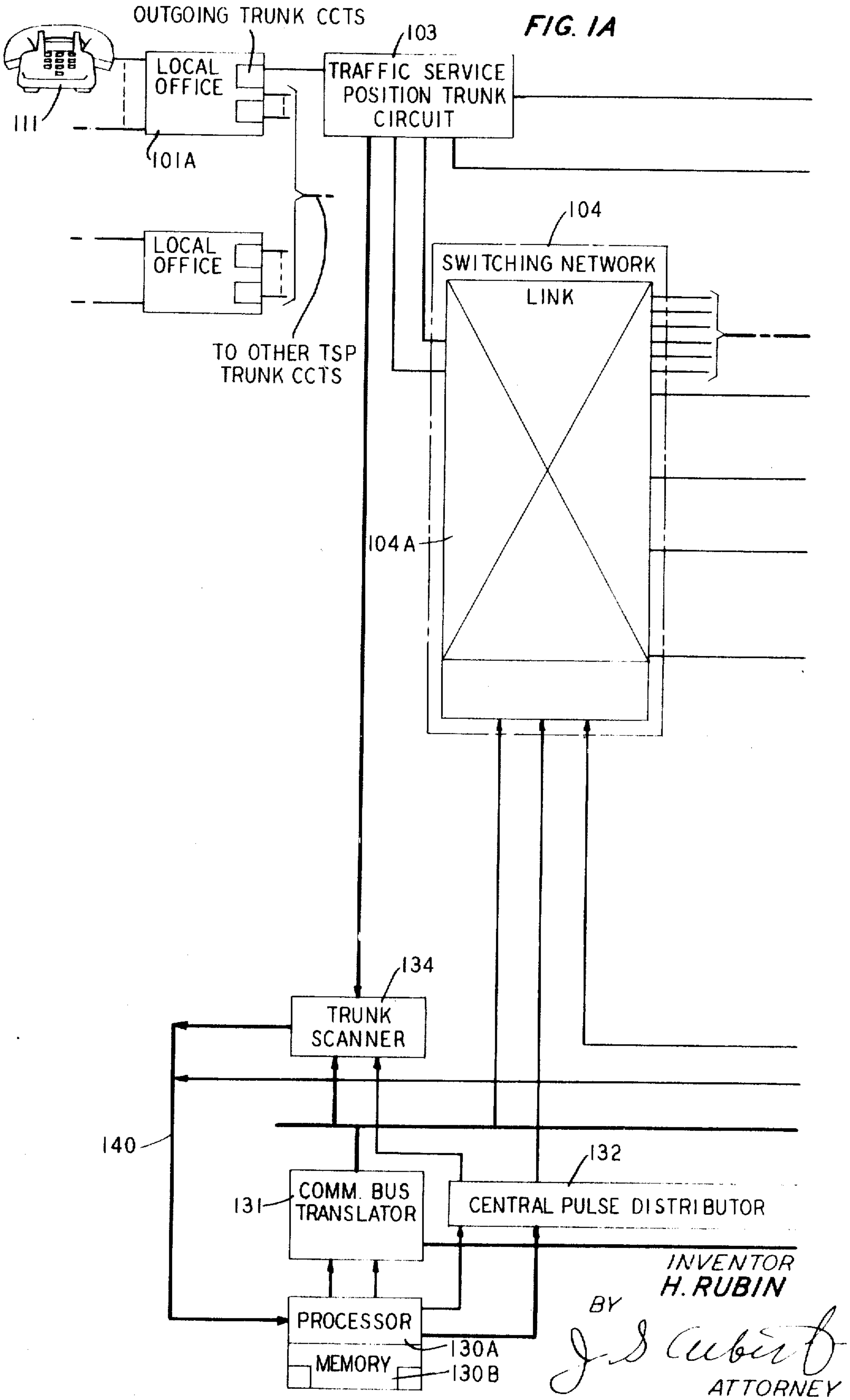
FIGS. 1A and 1B show a telephone switching system which includes an illustrative embodiment of my invention.
Figure 1B:
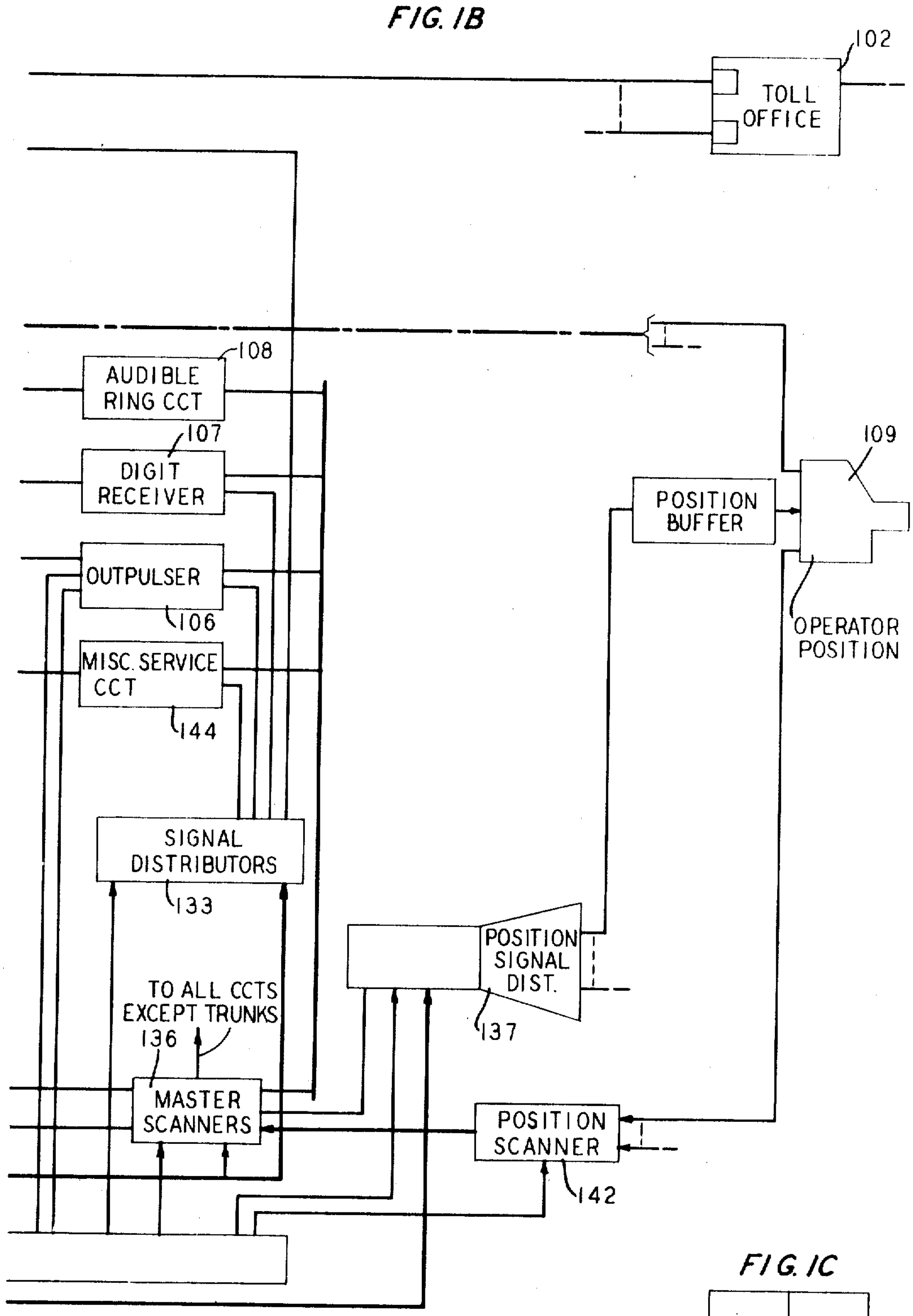
Figure 1C:
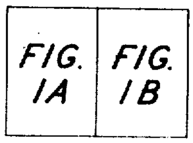
FIG. 1C shows the arrangement of FIGS. 1A and 1B.

FIG. 1 shows a telephone switching system associated with a trunk that is connected between a local office and a toll office. The switching system is of the type described in U.S. Pat. No. 3,484,560 which issued Dec. 16, 1969 to R. J. Jaeger, Jr. and A. E. Joel, Jr. and incorporates a common control processor. It is to be understood that the switching system is given by way of example and that my invention may be incorporated into data processing equipment of various types. The switching system of FIGS. 1A and 1B provides connections between the trunk interconnecting local office 101A and toll office 102 and operator position 109. The switching system of FIGS. 1A and 1B provides special services to a subscriber such as required in coin, person-to-person and other types of calls. The line connected between local office 101A and toll office 102 includes a traffic service position trunk circuit 103. This trunk circuit is selectively connected to operator position 109 via link network 104A of switching network 104 when special services are required. Network 104 is controlled by the common control arrangement including processor 130A and memory 130B. The common control processor receives signals from trunk circuit 103, position 109, and other circuits associated with the switching network such as outpulser 106, digit receiver circuit 107 and audible ring circuit 108. Processor 130A under control of stored command instructions from memory 130B responds to said signals and provides output signals to control the operation of circuits associated with network 104 and the connections through link network 104A to trunk circuit 103. For example, a request signal from station 111 via trunk circuit 103 may require connection of selected service circuits such as position 109 and digit receiver 107 to local office 101A. Processor 130A is alerted via scanner 134. The request signal from the trunk is stored and interpreted under control of instructions from memory 130B and signals are sent from processor 130A by way of translator 131 and pulse distributor 132 to set up the required connections. In this way special services required by telephone subscribers are provided by the switching system.

Signals from trunk circuit 103 are transmitted to trunk scanner 134 and therefrom via line 140 to processor 130A. Scanned trunk signals are converted into trunk data in processor 130A and the data is stored in memory 130B in a trunk register dedicated to the particular trunk circuit. In the normal course of events, the data stored in the trunk register are utilized by program instructions also stored in memory 130B and as a result of processing references to the trunk register the processor provides control signals to the trunk and other related service circuits via processor 130A, central pulse distributor 132, signal distributors 133, and position signal distributor 137. Common bus translator 131 is used to translate data from processor 130A into signals acceptable to pulse distributor 132, scanners 134 and 136, signal distributor 133, and position signal distributor 137. The plurality of operator positions including position 109 are scanned by position scanner 142 which applies scanned signals to processor 130A via master scanner 136.

The other circuits serving a call in the switching system of FIG. 1B include audible ring circuit 108, digit receiver 107, outpulser 106 and miscellaneous service circuit 144. These service circuits are scanned by master scanner 136 and data corresponding to scanned information from these circuits are processed in processor 130A. The results of the processed scanned signals are then stored in multicode registers in memory 130B. Each register is permanently assigned to a distinct service circuit. It is to be understood that there are a plurality of service circuits, operator positions and trunk circuits so that a plurality of local offices may be served.

Figure 2:
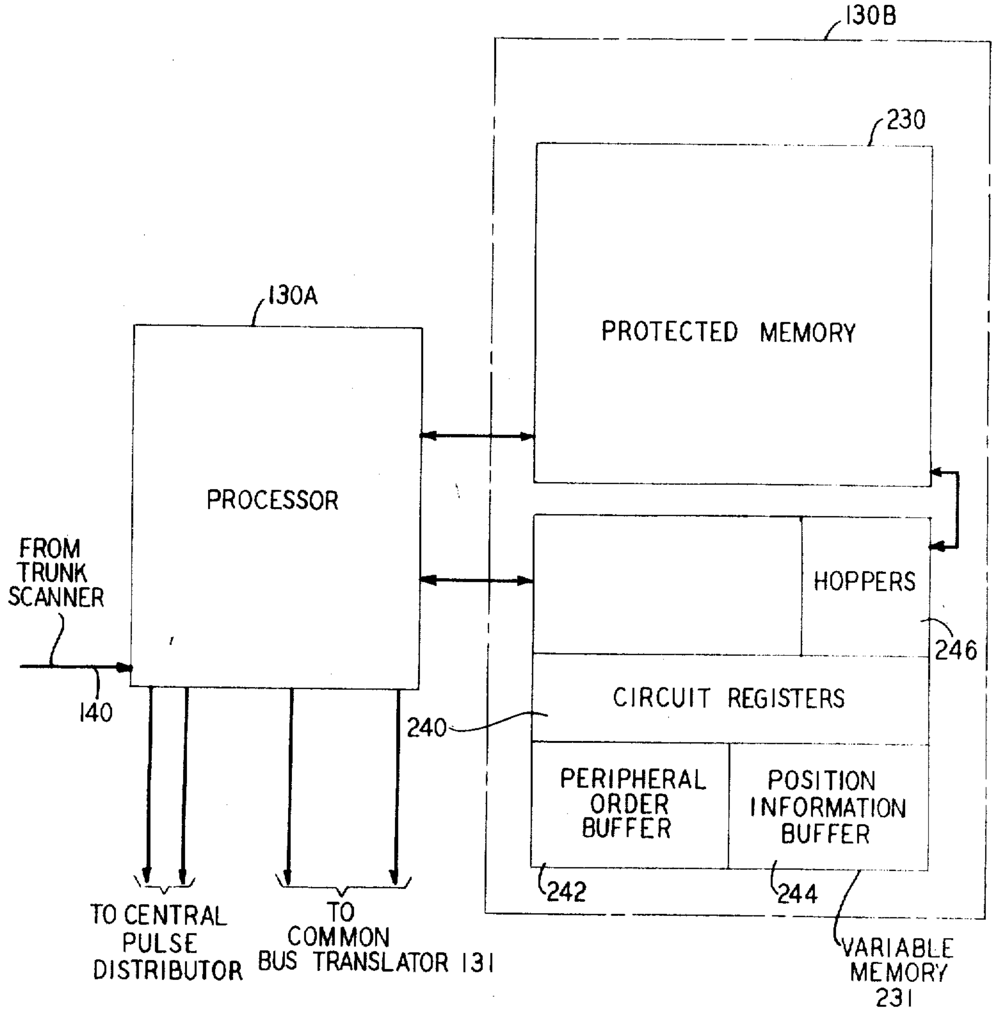
FIG. 2 depicts the common control processor and store arrangement of the switching system of FIG. 1.

Processor 130A and memory 130B are shown in greater detail in FIG. 2. The processor may be of any type known in the art, for example, that described in U.S. Pat. No. 3,370,274 which issued to A. W. Kettley, W. B. Macurdy, D. Muir III, and U. K. Stagg, Jr. on Feb. 20, 1968. Memory 130B is divided into two sections. Section 230 is a protected memory in which information is permanently stored. This information includes the permanently stored program instructions in accordance with which the operation of the switching system is controlled and permanent lists of equipment and equipment locations of various circuits of the switching system. The other part of the memory contains transient data concerning individual call connections. Included in variable memory 231 are registers dedicated to the individual circuits of the switching system. The registers are in section 240 and are linked together into lists organized in accordance with the circuit functions presently being processed. Section 242 of variable memory 231 contains a group of peripheral order buffers (POBS) which are used by processor 130A in accordance with stored instructions of protected memory 230 to address the circuits of the switching system associated with call functions. A position information buffer (PIB) arrangement is also included in section 244 of memory 231 to provide a means for transferring information between operator position 109, memory 130B, and the circuits associated with switching network 104. Section 146 of the memory contains hoppers which store and direct scanned information to the registers of section 240.

Figure 3B:
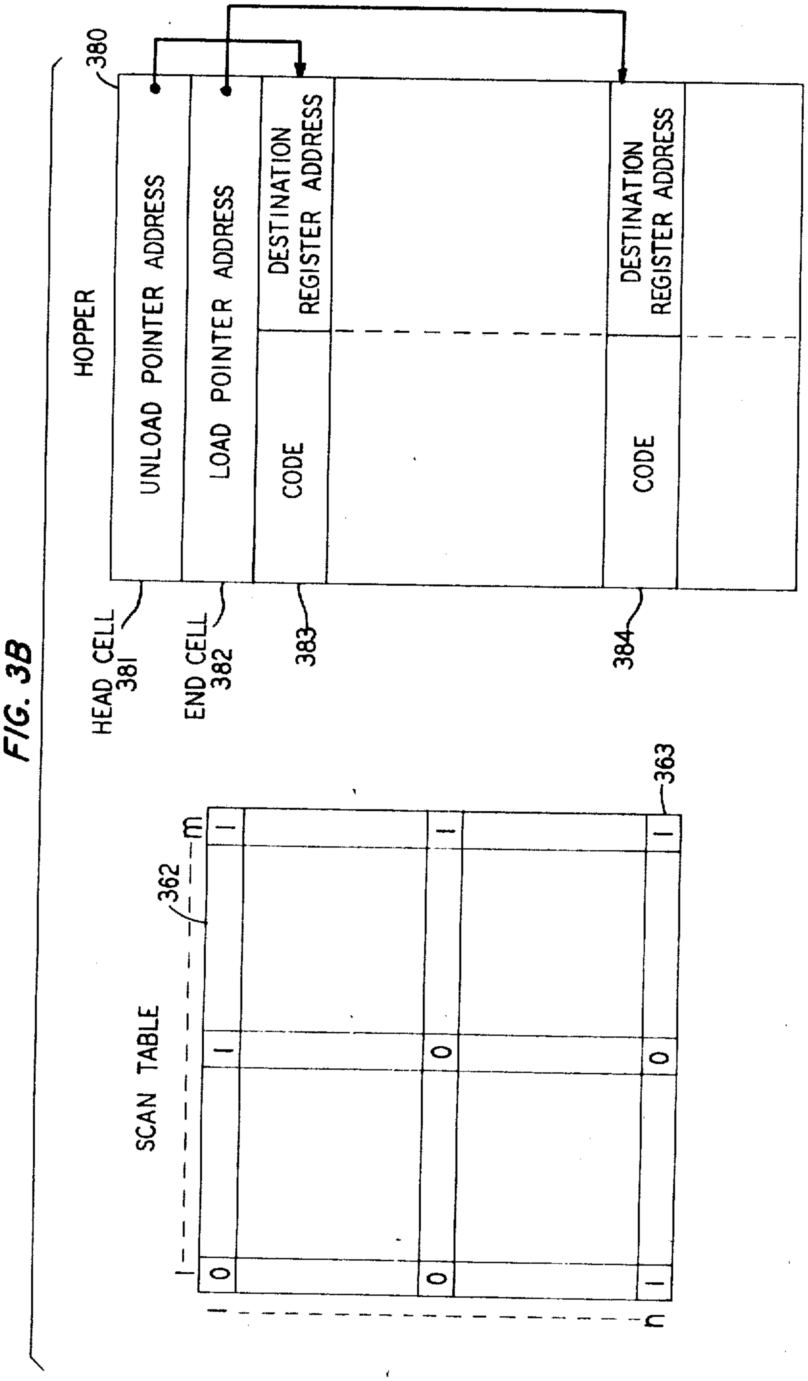
FIGS. 3A and 3B depict illustrative linked lists and a scan table in the store of FIG. 2 in greater detail.
Figure 3A:
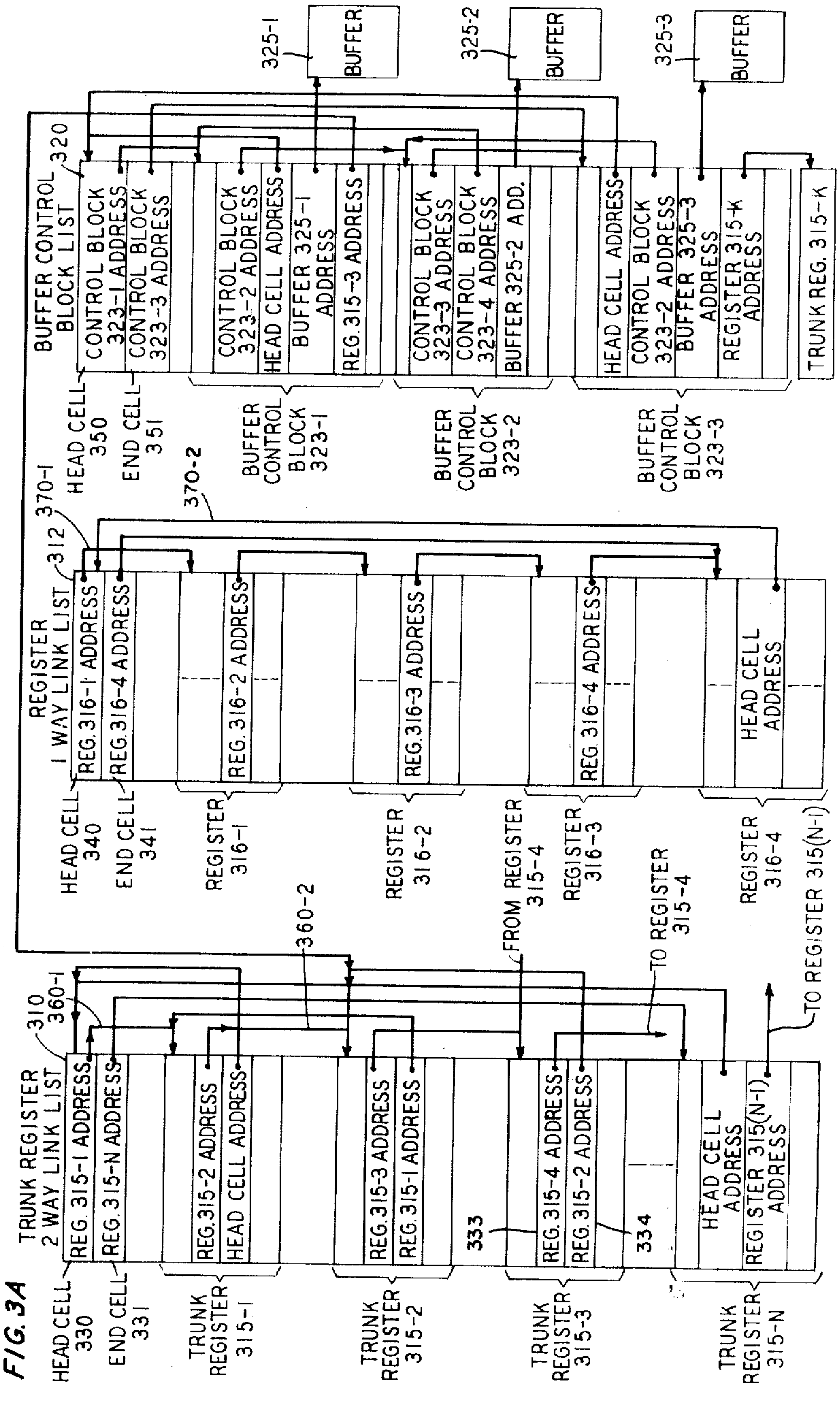

The linked lists of memory 231 are illustrated in greater detail in FIG. 3A. The two-way linked list 310 comprises head cell 330, end cell 331, and a number of registers including registers 315–1, 315–2, 315–3 and 315–*n*. Each of these registers is dedicated to a particular circuit, in this case a trunk circuit of the switching system, and is in a predetermined location in memory 231. The list arrangement may be used to perform a particular timing or queueing function on a plurality of registers in the list. For example, the registers of list 310 may be associated with different calls all of which must receive updating of call time duration. Such a list may be particularly useful in coin call connections where, at the end of a predetermined time, coin collection is required. The trunk registers of list 310 are periodically processed in processor 130A in accordance with the program instructions of protected memory 230. When coin collection is needed for a particular register, an operator position is connected to the trunk for collection purposes. Upon collection, the register is removed from the list and the list is modified.

Head cell 330 contains the address of the first register on the list, that of register 315–1, and this address is thus available to processor 130A. The address linkage between the head cell 330 and register 315–1 is illustrated by pointer 360–1 shown between the head cell and the first word of trunk register 315–1. The second register on the list, 315–2, is addressed by a separate word in register 315–1 as shown in FIG. 3A and the forward pointer is 360–2. This pointer extends from the forward address word of register 315–1 and the first word of register 315–2. List 310 is a two-way linked list which requires that each register on the list point to both the immediately preceding and the immediately succeeding register. Thus register 315–2 is linked by a backward address word to the first word of register 315–1 and is also linked by the forward address word to the first word of the register 315–3. The list arrangement of list 310 advantageously links together the trunk registers associated with a particular function such as timing or queueing of registers so that processor 130A can obtain access to particular switching system equipment in accordance with one of several operating programs stored in memory 230. End cell 331 contains the address of the last register on the list and is modified when a register is added or removed from the list.

One-way linked list 312 contains a group of registers organized into a list which utilizes only forward pointers between dedicated registers. Such a list may contain registers assigned to outpulsers that are in a queue for a particular call processing operation. Head cell 340 and end cell 341 define the beginning and the end of the list. The head cell contains the address of the first register on the list, in this case register 316–1, and points by way of the address in word 340 to the first word of register 316–1 as illustrated by pointer 370–1. End cell 341 contains the address of the last register on the list, in this case register 316–4, and points to register 316–4 by means of the address in word 341 as indicated by pointer 370–2. Each of the registers on the list in turn points to the next succeeding register on the list. In this way linkages are established for utilization by processor 130A during particular list processing operations.

As registers are processed in processor 130A under control of the instructions from memory 230, they may be added to or taken off lists such as lists 310 and 312. Each of the registers, in addition to list linkage address words, contains transient data codes relating to the status of the circuit assigned thereto so that processing references to the register provide the necessary information for the performance of the present call functions. The register also stores the prior status of the assigned circuit.

In addition to lists of registers organized in accordance with common circuit functions, variable memory 231 also contains peripheral order buffers and position information buffers and hoppers. These buffers comprise stored lists of data for use by the processor during operating programs to receive and send signals to the assigned circuits in accordance with the common control program instructions contained in memory 230. Linked buffer control block lists are arranged in memory 231 so that data stored in the buffer may be processed in logical order according to the requirements of the operating programs. Buffer control block list 320 illustrates a peripheral order buffer control block list. The control block list contains head cell 350, end cell 351, and three control blocks 321–1 through 321–3. Each control block is linked to the preceding and succeeding control block and the first control block 323–1 is accessed by means of the address contained in head cell 350. The last control block 323–3 is pointed to by end cell 351. In addition to linkage codes, the control blocks contain the addresses of the associated buffers and related registers. For example, control block 323–1 contains the address of buffer 325–1 which address is used as a pointer to buffer 325–1. Buffer control block 323–1 may also contain the address of register 315–3 if that register is associated with the data of buffer 325–1. As the program instructions proceed through the list, each buffer is made available to the operating program currently being performed in processor 130A so that the orders relating to a particular call may be accessed and performed in an expedient manner. The buffers, however, are not linked to the registers of section 240.

As illustrated with respect to buffer 325–3, the linked buffer control block 323–3 contains the address of the register being operated on, in this case register **315–*k*, so that the program instructions may access said register during the performance of instructions related to the buffer. It should be noted that register 315–*k* may be on a linked list such as list 310 while being referenced in buffer 325–3**. The position information buffer arrangement is substantially similar to the peripheral order buffer arrangement except that the control blocks are placed on one-way linked lists.

Hoppers provide an expedient means of transferring data codes from positions and other circuits to registers. Hopper 380 in FIG. 3B comprises a head cell 381, end cell 382 and sequential list words such as 383 and 384, each containing a data code to be transferred and the destination register address for the data code. Head cell 381 contains an unload pointer address which points to the word on the list to be unloaded next. End cell 382 contains a load pointer address pointing to the next word on the list which will receive information directed to hopper 380. In hopper 380, the head cell points to word 383 and the end cell points to word 384. The data codes include report codes which are formed as a result of assigned circuit signals. Such reports may refer to the supervision status of the call connection.

Figure 4:
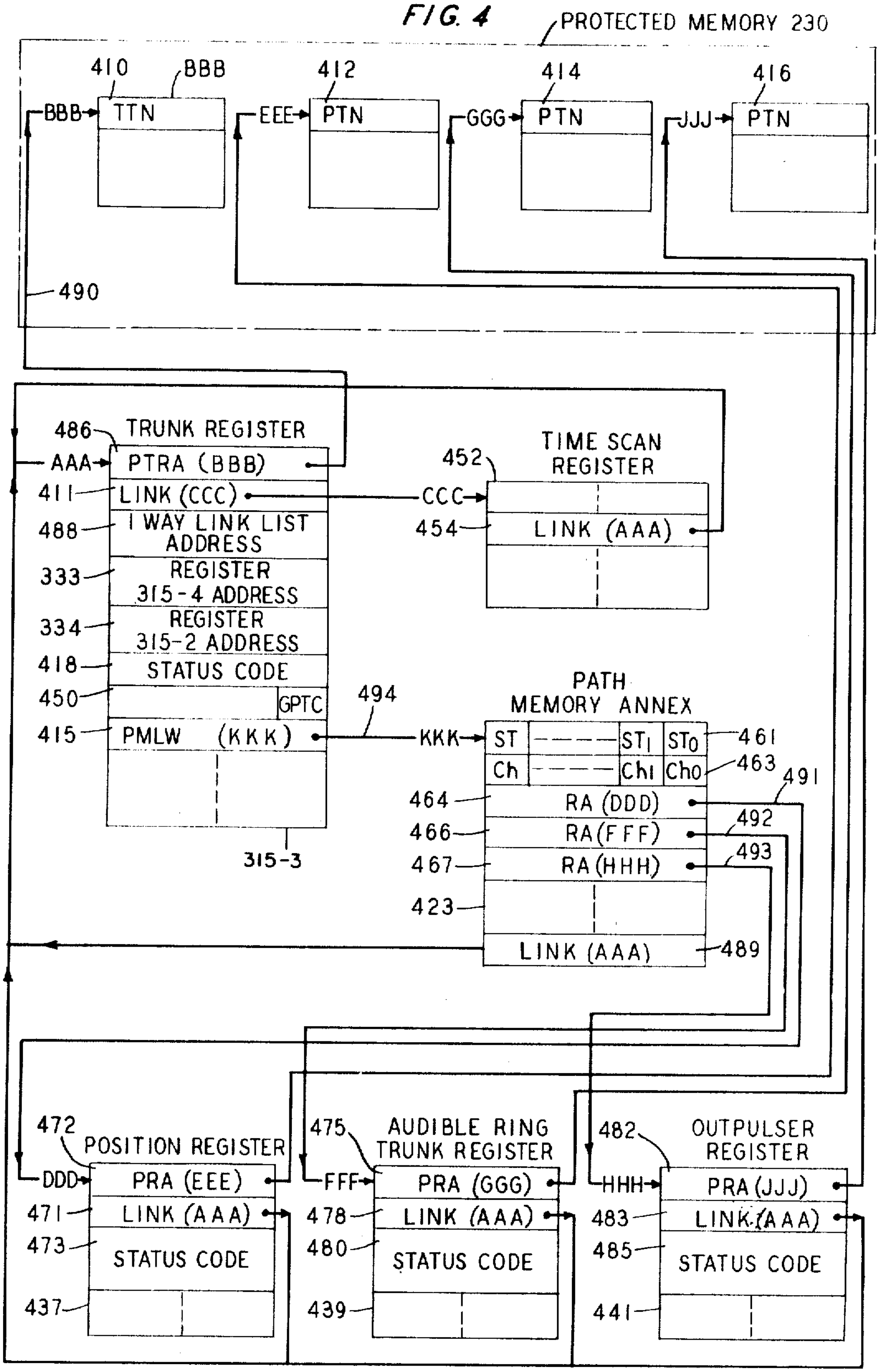
FIG. 4 depicts the linkages between associated registers in the arrangement of FIG. 2.
Figure 6A:
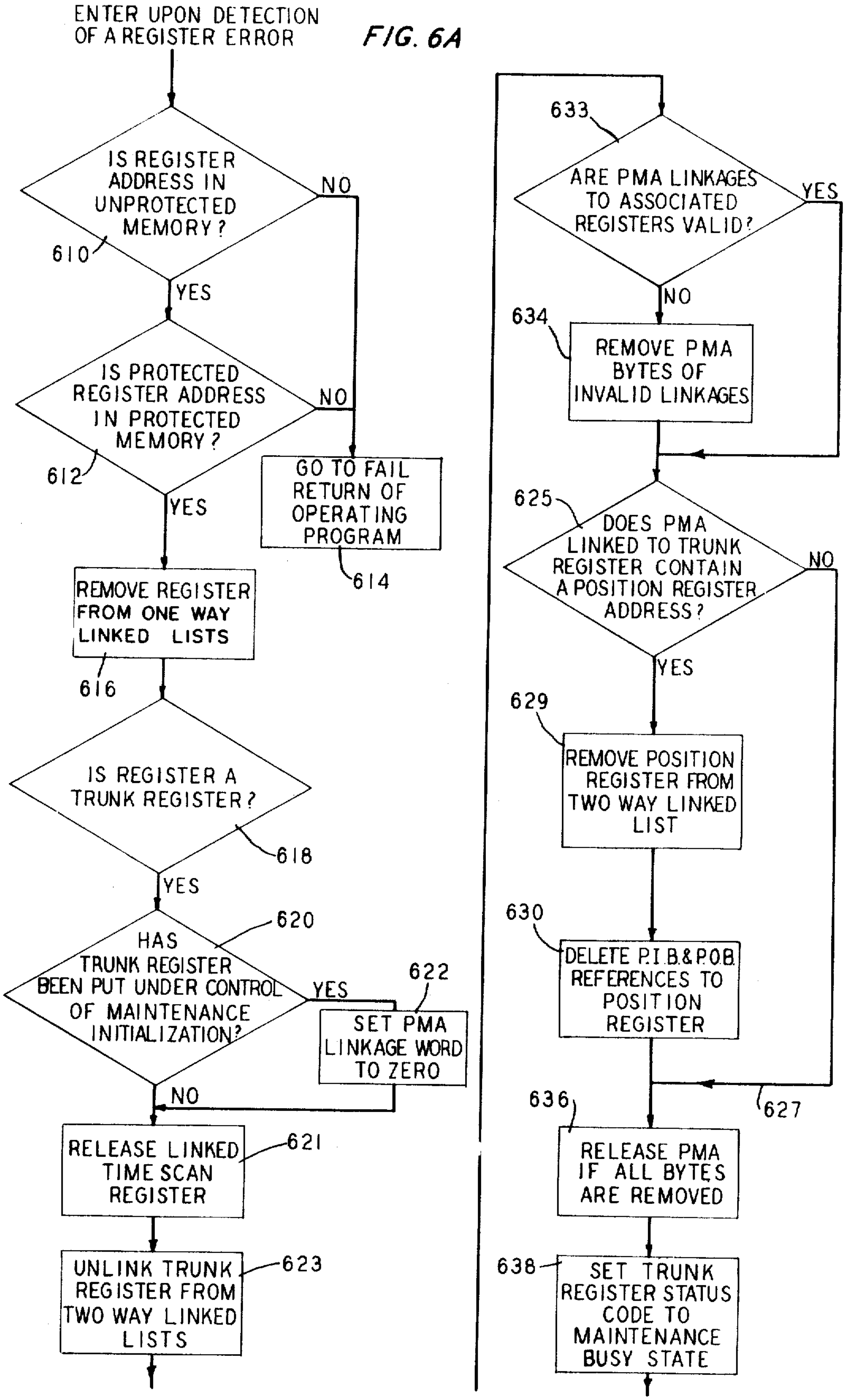
FIGS. 6A through 6D are diagrams illustrating the method of removing an inconsistently linked register from the memory arrangement shown in FIGS. 2, 3 and 4.
Figure 6C:
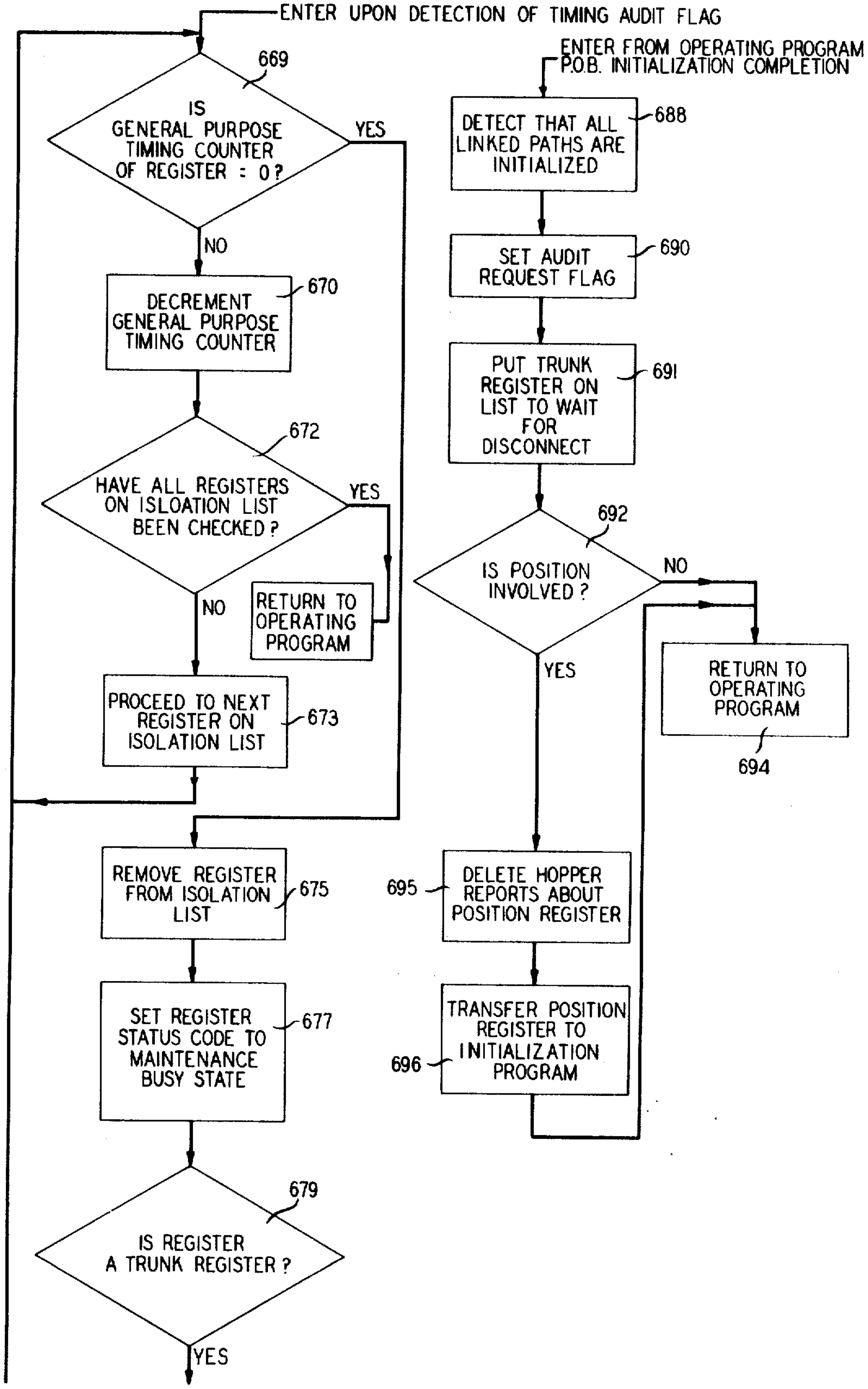
Figure 6D:
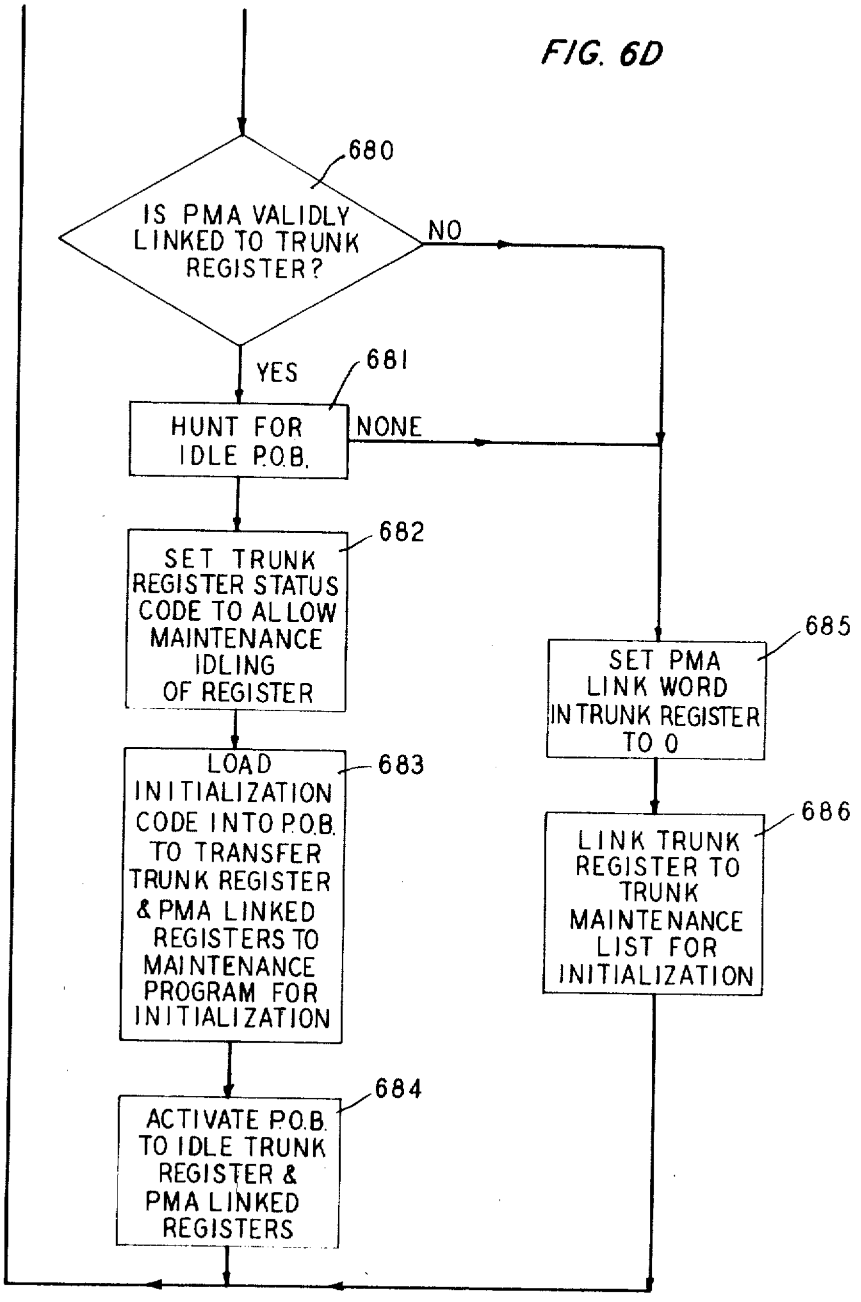
Figure 6F:
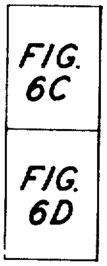
FIG. 6F shows the arrangement of FIGS. 6C and 6D.
Figures 6B, 6E:
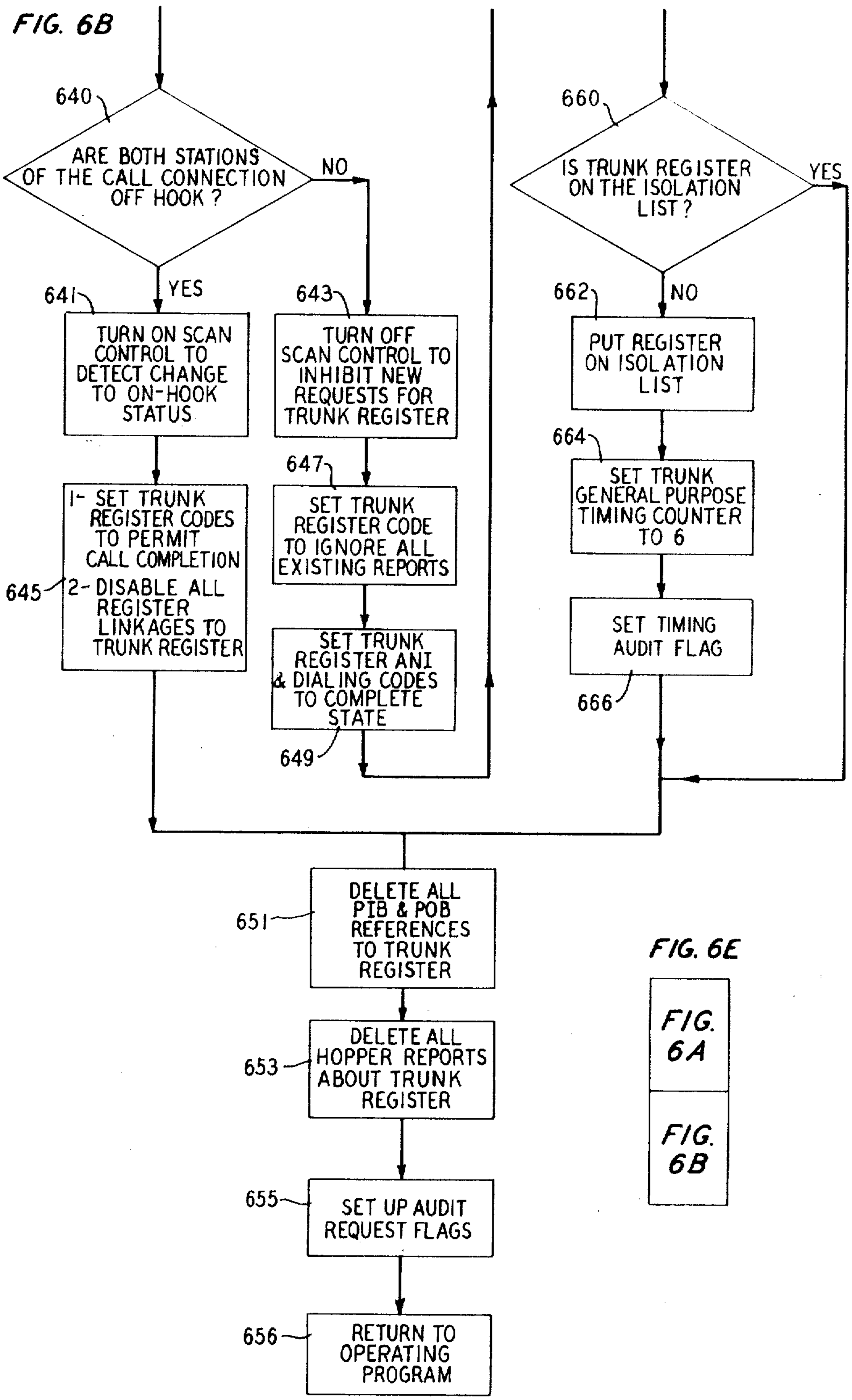
FIG. 6E shows the arrangement of FIGS. 6A and 6B.

The list linkages illustrated in FIG. 3A are organized in accordance with registers having common circuit functions such as timing or queueing. The registers associated with a call connection are also linked to each other so that operations of the different circuits involved in the call connection may be coordinated. This is illustrated in FIG. 4 wherein trunk register 315–3 is shown. Word 486 of trunk register 315–3 contains the address of a protected register associated with the trunk circuit. The protected register stores codes relating to permanent trunk information, e.g., trunk location and terminal positions. In FIG. 4, the address of the protected trunk register 410 is BBB and pointer 490 is shown from the word 486 of trunk register 315–3 (address AAA) pointing to word BBB of protected memory.

Assume, for purposes of illustration, that trunk register 315–3 is involved in a call connection requiring the use of position register 437, audible ring register 439, and outpulser register 441 for purposes of obtaining operator information, audible ring signals and outpulsing, respectively. In this event trunk 315–3 is linked via word 415 to word 461 of path memory annex 423. Path memory annex 423 contains a list of addresses of the registers associated with trunk register 315–3 so that these associated registers are made available to the operating programs concerned with the particular call connection as they are performed in processor 130A. Thus, there is linkage from the path memory annex 423 to position register 437 via word 464, to ring trunk register 439 via word 466 and to outpulser register 441 via word 467. It is to be understood that these last mentioned registers may also be on timing and queueing lists organized in accordance with circuit functions.

Word 464 of path memory annex 423 contains the DDD address of word 472 in position register 437. Word 466 of position register 437, in turn, contains the EEE address of protected position register 412. Thus the permanent information concerned with the position may be accessed by the program via the path memory annex. In like manner, ring trunk register 439 and outpulser register 441 are also linked to the path memory annex 423 and to their respective protected registers 414 and 416. The last word of path memory annex 423 is linked back to word 486 of register 315–3 (address AAA). A time scan register such as register 452 may also be linked to register 315–3. This register acts as a store to transfer information derived from scanner 134 from the scanner to the register during performance of an operating program. Such a transfer may be done via a hopper.

Figure 5:
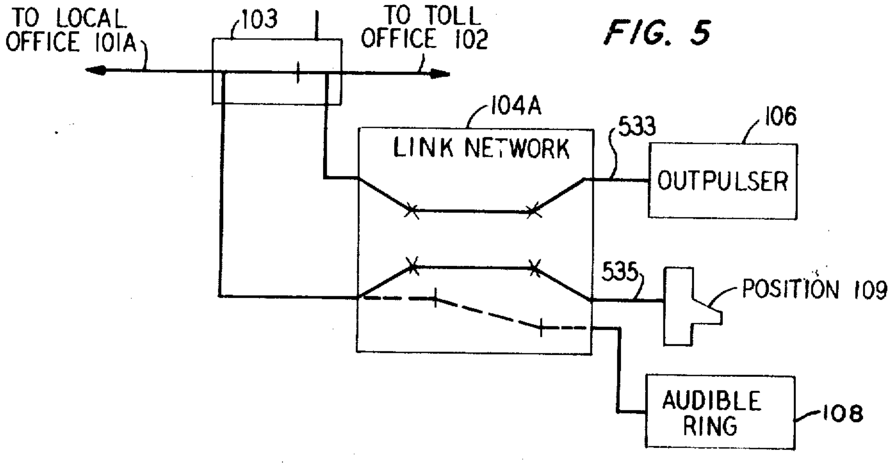
FIG. 5 illustrates circuit connections controlled by the memory arrangements of FIGS. 2, 3 and 4.

FIG. 5 illustrates the actual path connections which are controlled by the registers shown on FIG. 4. Such control is accomplished by means of program instructions operating in processor 130A and utilizing the information contained in the call function associated registers to control the operation of trunk circuit 103 associated with trunk register 315–3, outpulser 106 associated with register 431, position 109 associated with register 437, and ring trunk 108 associated with register 439. The path connections in link network 104A illustrated in FIG. 5 are controlled by processor 130A in accordance with the information stored in the registers shown on FIG. 4 and are applied to the circuits assigned to the registers via processor 130A, distributors 132 and 133. As indicated in FIGS. 1A and 1B, a plurality of trunk circuits and associated service circuits and position circuits may be concurrently operated under control of processor 130A and memory 130B so that a number of call connections may be processed concurrently.

During system operation, processing programs operate on the linked lists illustrated in FIG. 3A via processor 130A. Processing references to the registers cause data signals to be transferred to the processing programs which, in turn, modify the codes of the registers and cause signals to be sent to control the assigned circuits. Each register contains a status code which stores the present usage of the register. For example, the status code comprises a traffic busy bit which in one state indicates that the register is already in use in a call connection and is unavailable for processing in another call connection. A maintenance busy bit is included which when set indicates that maintenance is being performed in the register and its assigned circuit. In this way, the individual status of each register is recorded so that processing references thereto appropriately perform the necessary call connection functions. If an error in the register or an error in register linkage is detected, the status code can be altered to prevent processing references to the register so that further call connection processing references to the register are rendered ineffective.

From the foregoing, it is apparent that the linkages between registers on individual lists organized according to circuit functions and the linkages between registers associated with a particular call connection provide the necessary organization of transient stored information. The linkages and list arrangements allow a plurality of calls to be concurrently processed by processor 130A under control of the program instructions stored in protected memory 230.

The linkages illustrated in FIG. 4 are periodically checked by audit programs which ascertain the state of the linkages and compare the status of the registers for consistency. In FIG. 4, the code of word 486 is checked to see that the address therein points to the associated trunk protected register 410. The path memory annex 423 is checked to see that it appropriately points to valid variable memory addresses for the associated position register 437, the associated audible ring trunk register 439, and the associated outpulsing register 441. These last mentioned registers are checked to see that the linkage words therein, 471, 478, and 483, point to the AAA address of word 486 in trunk register 315–3. The linkage between register 315–3 and scan register 452 is also checked to determine that register 452 is addressed by the code in word 411 and that the AAA address of word 486 is addressed by word 454 of register 452. The status words of the registers, word 418 of the trunk register, word 473 of the position register, word 480 of the audible ring trunk register, and word 485 of the outpulser register, are also checked to see that the status of each of these registers is consistent with the status of the other associated registers, other stored data words in memory 231, and the status codes stored in path memory annex 423. Where an error in register status or register linkage is found, the call processing involving that register is probably in error and all the linkages assigned to the trunk register and associated service circuit registers in linked lists such as in FIG. 3A and in the registers of FIG. 4 must be torn down. This is required so that the errors in a call connection associated with the register configuration of FIG. 4 are prevented from propagating to other call connections via the processing of the linked lists.

The linkages of the lists illustrated in FIG. 3A are also periodically checked by audit programs to determine that the linkages are consistent and that the status words of the registers on the lists are proper. One-way list 312, for example, is periodically examined to check that the head cell points to register 316–1, that the end cell points to register 316–4, and that each register on the list points to a succeeding list register. The codes of each register are inspected to determine whether it is properly on the list. If, for example, register 316–2 did not point to a valid register address in variable memory 231, the list is flagged as inconsistent and register 316–2 and all succeeding registers on the list are suspect. In this case, register 316–2 is removed and the list is closed after register 316–1. When the status word of register 316–2 indicates the register is idle but the register is on a timing list, register 316–2 must be removed therefrom.

In the event that the linkage codes of the registers of memory 231 are inconsistent with the tasks assigned thereto or that the status words of the registers in memory 231 are in error or inconsistent, the suspected registers and their associated service registers must be unlinked so that proper call processing can be continued. If this is not done and the suspected registers are used in an operating call processing program, the errors in suspected registers may be propagated to other parts of the switching system.

According to my invention those registers detected as being inconsistently linked or containing erroneous information are unlinked from the linked lists of FIG. 3A and the linkages of FIG. 4 between registers associated with a particular call connection are unlinked. In this way the suspected part of the memory is removed from active service and the circuits associated with the suspected registers are idled without affecting the valid portions of the memory. The removal process includes linking registers in error onto an isolation list for a predetermined time during which store and processing references to the registers in error are deleted.

My invention is an arrangement which permits the tearing down of a call connection assigned to an inconsistently linked or error-containing register. The arrangement advantageously unlinks only the affected call connection registers and modifies the codes of such registers so that they and their assigned circuits are put into an idle state. In this idle condition, they are available to service other calls. While my invention is described with respect to an inconsistently linked trunk register, it is to be understood that substantially similar arrangements may be used where an associated register (FIG. 4) is found to be inconsistently linked.

Upon the detection of an error in a register during audits of linkages and register status codes in processor 130A, the arrangement generally described in FIGS. 6A through 6D is entered and is performed by processor 130A in accordance with instructions stored in protected memory 230. Assume for purposes of illustration the detected inconsistently linked register is register 315–3 and its assigned circuit is trunk circuit 103. The detected register is first checked as indicated in decision box 610 to determine whether or not address (AAA) in word 486 is a valid unprotected memory address. If it is not a valid variable memory address, the operating program, during which the inconsistent linkage was detected, is returned to a fail-return address of the generating operating program. This is indicated in operation box 614. The fail-return flags the operating program so that other maintenance procedures may be employed.

If the register address is in unprotected memory, the associated protected register address is checked in box 612 to see if it is in protected memory. Thus the address of the first word of protected register 410 (BBB) is compared with the range of addresses in protected memory to see that it is a valid protected memory address. If it is not, control is transferred to the fail-return address of the operating program as shown in operation box 614. If the protected address is valid, the program is continued in operation box 616 and the detected register is removed from the one-way lists on which it may be found. Since only forward pointers are used in one-way lists, the entire list must be searched to delete the erroneous register. Register unlinking is done by altering the one-way link list address code in word 488, and the link word of the preceding register on the one-way link list. As indicated in decision box 618, the register is then checked to determine if it is a trunk register. This is done by testing the contents of the first word of protected trunk register 410 to see that the circuit register index contained therein is that of a trunk register. If it is a trunk register, decision box 620 is entered and status code in word 418 of the register is checked to determine whether the register has been previously found to be in error and has previously been processed in accordance with the arrangement of FIGS. 6A through 6D. Where the status code indicates the detected trunk register has previously been detected, path memory annex linkage word 415 code (PMLW) is set to zero whereby the linkages between the detected trunk register and the associated service registers of FIG. 4 are broken so that trunk register initialization is done independently from the initialization of the associated registers. This is shown in box 622.

The linked time scan register is then released in accordance with operation box 621. As illustrated in FIG. 4, register 452 is the time scan register which is unlinked from trunk register 315–3. The unlinking includes altering the code of word 411 of register 315–3 and the linking code of word 454 of register 452.

The detected trunk register is then unlinked from any two-way link lists on which the register may be found in accordance with operation box 623. For example, register 315–3 is on two-way link list 31 shown in FIG. 3A. It is unlinked by altering the codes found in words 333 and 334. The removal of linkage requires that the linking words of registers 315–2 and 315–4 be changed so that these registers link to one another and not to register 315–3. This is done with reference to the backward and forward pointer addresses in the register being removed.

After the operations indicated in box 623 have been performed, detected register 315–3 is no longer on any list except possibly an isolation list to be described. The unlinking is done so that further processing operations pertaining to lists do not affect the data stored in register 315–3. In this way, errors in the detected register or in its linkages are prevented from propagating through the switching system and affecting other unrelated network connections. The state of the assigned trunk circuit, however, is not altered and its network connections remain unchanged. References to the detected register in other data words of the memory or PIB store 244, POB store 242 or hopper store 246 may still alter the contents of the detected register and change the state of the assigned circuit. Additionally, the associated service registers 437, 439 and 441 are still linked to register 315–3 via path memory annex. The circuits assigned to these associated service registers remain connected to the network in accordance with the data stored in these registers. If the path memory annex linkage code (PMLW) in word 415 has not been set to zero in box 622, store references to the detected register must be deleted. All the registers shown in FIG. 4 must be disassociated and their codes put into idle states. These tasks must be performed so that the connection associated with the inconsistent linkage is completely torn down and the registers associated with an error and their assigned circuits are available for other uses.

As shown in decision box 640, trunk circuit 103 assigned to detected register 315–3 is scanned next via trunk scanner 134 and processor 130A to determine whether the stations associated with the call connection are both off hook. Where the stations are both off hook, the call is assumed to be in a talking state and modifications to register 315–3 are made to allow the call to continue. In order to accomplish this, scan control is turned on to detect any change in hook status.

Scan control is effected through trunk register scan control table 350 on FIG. 3B. This table is included in memory 231 and comprises a two-dimensional addressable matrix of single bits each of which indicates whether a particular trunk register is conditioned to receive scanning information collected by trunk scanner 132. Each bit of the table is addressed by its coordinates. If trunk register 315–3 is assigned to position *m*, *n* of the table, the bit in this position is inspected befored scanned information is applied to register 315–3 via time scan register 452. If the bit in position *m*, *n* is a binary one, the scanned information is transmitted to register 315–3. Where the bit is a binary 0, the scanned information is prevented from being inserted into register 315–3. Referring to operation box 641, the entry in the scan control table assigned to detected register 315–3 is set to a binary one. If one of the parties to the call later goes on hook, the trunk register is flagged so that it may be idled. Otherwise, the register remains in a state that causes the assigned trunk circuit to maintain the cell connection.

After the instructions concerned with turning on scan control in operation box 641 are completed, operation box 645 is entered and the trunk register codes are altered to permit call completion without charge. This is done by altering the status code of word 418 in trunk register 315–3. At this point the register linkages to trunk register 315–3 are disabled. These registers will later be processed by further audit programs which will detect their unlinked states, as indicated in box 645, and cause them to be idled.

At this time where there is a talking connection, no registers are linked to trunk register 315–3 but there may be references to trunk register 315–3 in the store items of the peripheral order buffers, the position information buffers or hoppers since these have not as yet been affected by the tear down procedure. As indicated in operation box 651, all the POBs and PIBs are searched in accordance with their control block lists and references to trunk register 315–3 in said buffers are deleted. One such reference is shown in buffer control block 323–1. This reference is accessed through an inspection of list 320. If this reference were not deleted, the normal processing of data in the PIB's or POB's could change the contents of trunk register 315–3 and could possibly alter the connections of the associated trunk circuit. There are no address linkages between position registers, trunk registers and PIBs or POBs.

Control is then shifted to instructions in accordance with operation box 653 and all hopper reports referring to the trunk register are deleted. Such hopper reports contain information concerning changes in trunk scan states which are no longer valid in view of the unlinking of the trunk register.

As illustrated in operation box 655, audit request flags are then set in a separate maintenance control block in memory 231 so that further auditing of the affected lists and just disabled register linkages may be accomplished. These audits will detect any further inconsistent links that may remain and also cause the just unlinked registers to be idled. At this point, control is returned to the operating program in accordance with operation box 656 and the operating program continues to process the calls currently in the system without being affected by the now removed register 315–3. Register 315–3 will later be initialized in accordance with operation box 686.

Referring to decision box 640, if it is determined that only one station is off hook indicating a nontalking state, the scan control bit for register 315–3 is set to a binary zero and further reports of hook status are ignored. This is done in accordance with operation box 643 so that the call connection can be removed without further delay. As illustrated in operation box 647, the trunk register status code 418 is altered to ignore all existing reports since these reports are related to a suspected call connection. In operation box 649, the codes indicating reception of the automatic number identification of the calling station, e.g., station 111 and the dialed number code from said calling station 111, are set to the complete state to prevent further system responses to detected register 315–3.

As indicated in decision box 633, the path memory annex linkages 491, 492, and 493 and the linkages from the associated service registers to trunk register 315–3 are then checked to determine that their linkage address words point to word 486 of trunk register 315–3. The PMA linkages to the service registers are stored in words 464, 466, and 467 of path memory annex 423 and are indexed by the codes in words 461 and 463. These codes, designated as state and channel bytes respectively, indicate the status of the linked service registers and also provide the means by which the registers are accessed in connection with trunk register 315–3. Where there are invalid linkages, e.g., a position register is not linked back to the trunk register, the bytes associated therewith are removed as indicated in box 634. If all bytes are removed and the associated service registers are thereby unlinked from the trunk register, the path memory annex is released (box 636).

Decision box 625 is then entered wherein it is determined whether the linked path memory annex 423 contains a position register address. Path memory annex 423 is addressed via the path memory linkage (PMLW) code of word 415. Where a position register is involved in the call, it must be deleted from any two-way list on which the position register appears and all orders in POBs and PIBs referring to that position register must also be deleted. This is done so that alterations in the position codes caused by operator action via hopper reports or POB or PIB data related thereto do not affect the codes stored in the detected trunk register 315-3. In this way, further alterations of the trunk register and its associated trunk circuit due to position registers are prevented. Where a path memory annex contains a position address, the path through operation boxes 629 and 630 are followed to decision box 633; otherwise, path 627 is followed.

The status code in word 418 of register 315-3 is changed to indicate that maintenance has been ordered for the trunk register and that the register is busy in box 638. The busy status prevents utilization of the register by the system before it is idled. Where the status code indicates the detected trunk register has previously been detected in box 622, the path memory annex linkage word 418 has been set to zero. Thus, the linkages between the detected trunk register and the associated service registers of FIG. 4 are broken so that trunk register initialization is done independently from the initialization of the associated registers.

An isolation list is maintained in a portion memory 231 to link together registers which are not available to system processing because of errors. The isolation list contains those registers detected as being in error or inconsistently linked. The registers in error are modified in accordance with the aforementioned arrangement shown on FIG. 6A and FIG. 6B. The registers on the isolation list cannot be altered except for isolation test timing for a predetermined time. During this time inputs to the registers associated with the call connection being torn down could still modify the contents of these registers were it not for the isolation list. In the absence of an isolation list, the trunk registers would be placed into service in other call connections and returns from subsequent operating programs related to the torn down call could cause errors in the common control and in the operation of the associated trunk circuit. As indicated in box 660, the isolation list is searched to determine if the detected register has been previously placed thereon by processor 130A.

If the detected register is found on the isolation list, control is passed to operation box 651. As aforementioned the path through operation boxes 651, 653, 655 and 656 causes references to the detected trunk register in the POBs, PIBs and hoppers to be deleted, thereby preventing references in the operating program from being made to the register concerned with the call connection being torn down. Where the detected register is not found in the isolation list, this register is linked to the isolation list and the general purpose timing counter code (GPTC) of word 415 in the register is set to six as in box 664. The setting of the GPTC code inserts data into the register to permit a timed 60-second interval during which interval the detected register remains on the isolation list. After the timing counter code of word 415 is set, a timing audit flag is also set in box 666. This flag causes the general purpose timing counter code to be altered every 10 seconds by a subsequent operating program whereby the detected trunk register is maintained on the isolation list for a total of 60 seconds.

With the timing audit flag set, decision box 669 is entered during said subsequent operating program and the state of the general purpose timing counter is tested. If the general purpose timing counter code is other than zero, the code is decremented as indicated in operation box 670 and a test is made to determine whether all registers on the isolation list have been checked in accordance with box 672. If so, control is returned to the operating program. If not, the next register on the isolation list is appropriately decremented. When a register has been on the isolation list for 60 seconds, its general purpose timing counter code is zero, and control is passed from decision box 669 to operation box 675, wherein the register is removed from the isolation list.

If the GPTC code in word 415 of detected register 315-3 is zero, the register is removed from the isolation list and operation box 677 is entered wherein the status code word 418 is changed to indicate a maintenance busy state. With the register in this state, it is available to the system for maintenance purposes only. Trunk register 315-3 and its associated service circuits may now be initialized so that it can be returned to service on a subsequent call request.

Prior to initialization, the path memory annex linkage word 489 path to the trunk register is checked to determine whether it is valid, i.e., contents of linkage word 489 = address AAA. If so, registers associated with the trunk are still linked thereto and all these registers can be initialized in accordance with the linkages as listed in path memory annex 423. If there are no PMA linkages to the register, then only detected trunk register 315-3 is initialized.

Upon finding a valid PMA linkage to the trunk register, a search is made for an idle peripheral order buffer as indicated in box 681. If an idle buffer in list 320 is found, the trunk register status code in word 418 is altered to allow the maintenance program access to the register. This maintenance program will later cause the register to be idled. As indicated in box 683 an order code is loaded into the peripheral order buffer found in box 681 to transfer the trunk register and the PMA linked registers to the maintenance program for initialization. This initialization accomplished through activation of the found POB in box 684 alters the codes of the PMA linked registers so that these registers are set to their idle states. The register initialization also causes the assigned circuits to revert to their idle condition. After the initialization code is loaded into the POB, this POB is activated to cause the initialization as indicated in operation box 684.

Where there is no valid PMA linkage to the trunk register or such a linkage exists but there are no idle POBs, operation box 685 is entered and the PMA link code in the trunk register word 415 is set to zero. This unlinks the path memory annex from the trunk register. Box 686 is then entered and the trunk register is linked to the trunk maintenance list for initialization of detected trunk register 315-3 and its associated trunk circuit 103. The service registers originally linked to the trunk register have been disassociated from the trunk register by the zeroing of word 415 in the trunk register. These service registers are not initialized and remain unavailable for service until further audit program arrangements detect their broken linkages and cause initialization.

When all linked paths have been initialized in accordance with operation box 684 by means of the completion of the POB orders during an operating program, this is detected in accordance with box 688 and an audit request flag is set so that the validity of the initialization can be later checked. The trunk register is then put on a high and wet list to await disconnection of the calling customer as indicated in box 691. While the trunk register is on the high and wet list, a test is made to determine whether a position is involved with the call that has just been torn down in box 692. If not, control is returned to the operating program as indicated in box 694. If a position is involved, all hopper reports referring to the position register are deleted as indicated in box 695 and the position register is passed through an initialization program as indicated in box 696 and control is returned to the operating program as in box 694.

What is claimed is:

1. In a data processor having a store comprising a group of items including a plurality of linked item lists, a method for initializing a distinct item linked to said plurality of lists comprising the steps of:
   - disassociating said distinct item from said plurality of linked item lists,
   - altering said distinct item to ineffectuate processing references thereto,
   - isolating said distinct item in said store for a predetermined time,
   - deleting store references to said distinct item during said predetermined time, and
   - modifying said distinct item to correspond to a preassigned state at the end of said predetermined time.

2. In a data processor having a store comprising a plurality of items including a group of selectively linked items and a plurality of linked item lists, and means for detecting items in error, a method for initializing a detected item linked to said group of selectively linked items and to said plurality of linked item lists comprising the steps of:

unlinking said detected item from said plurality of linked item lists, altering said detected item to ineffectuate processing references thereto, checking the other selectively linked items for errors in said detecting means, if an error is detected in said other selectively linked items, unlinking said other selectively linked items from said detected item, isolating said detected item in said store for a predetermined time, deleting store item references to said detected item during said predetermined time, if an error is detected in the checking of said other selectively linked items modifying said detected item to correspond to a preassigned state at the end of said predetermined time, and if an error is not detected in the checking of said other selected linked items modifying said selectively linked items to correspond to preassigned states at the end of said predetermined time.

3. A method for initializing a distinct item of a group of linked multicode items and a plurality of linked item lists in the store of a data processor comprising the processor performed steps of:

altering a first code in said distinct item to unlink the distinct item from said plurality of linked item lists, altering a second code of the distinct item to ineffectuate processing references to said distinct item, altering said first code to link said distinct item to a list for isolating distinct items in said store for a predetermined time, deleting store references to said distinct item during said predetermined time, and modifying said distinct item codes to correspond to an idle state at the end of said predetermined time.

4. In a data processing system having a processor and a store, said store comprising a plurality of data words and a plurality of multicode registers, a first code in each register for storing the status of said register, a group of codes in each register, each code of said group for addressing other registers, means responsive to said register addressing codes for selectively linking said register to a group of said multicode registers, and means for detecting an error in one of said status codes and addressing codes, a method for initializing a register in which an error is detected comprising the processor performed steps of:

altering the status code of said detected register to ineffectuate processing references to said detected register, altering said detected register address codes to link said detected register to a list for isolating detected registers from other of said multicode registers for a predetermined time, deleting data words in said store making reference to said detected register during said predetermined time, and altering the codes of said detected register to correspond to a preassigned state after said predetermined time.

5. In a data system having a processor, a store and a plurality of peripheral devices, said store comprising a plurality of data items and a plurality of multicode registers, each register being assigned to a peripheral device, a code in each register for storing the status of the device to which the register is assigned, a code in each register for addressing at least one other register, means responsive to said register addressing code for linking said register onto a plurality of register lists whereby the operations of said devices are coordinated, and means for detecting an error in one of said status codes and address codes, a method for idling the register in which an error is detected comprising the processor performed steps of:

altering said detected register address code to unlink said detected register from said plurality of linked lists, altering said detected register status code to ineffectuate processing references to said detected register, altering said detected register address code to link said detected register to a list for isolating detected registers from said plurality of register lists for a predetermined time, deleting data items in said store referring to said detected register during said predetermined time, and modifying the codes of said detected register to cause the device to which the detected register is assigned to return to an idle state at the end of said predetermined time.

6. In a system having a plurality of peripheral devices and a common control, said common control including a processor and a store, said store comprising a plurality of registers, each register being assigned to a distinct peripheral device, means for linking selected registers to coordinate the operations of said peripheral devices, and means for detecting a distinct register; a method for initializing said distinct register comprising the processor performed steps of:

detecting said distinct register, altering said detected register to ineffectuate processing references thereto, isolating said detected register from the other selected registers for a predetermined time, deleting store references to said detected register during said predetermined time, and altering said detected register to put said assigned peripheral device in a preassigned state after said predetermined time.

7. In a system having a plurality of peripheral devices and a common control, said common control including a store comprising a plurality of multicode registers, each register being assigned to a distinct peripheral device, means for linking selected registers to coordinate the operation of the devices to which said selected registers are assigned, means for linking said registers into a plurality of lists to process data representing said devices, and means for detecting a distinct coded register, said lists including a list for isolating said distinct coded registers, a method for initializing a distinct register comprising the steps of:

detecting a distinct register, unlinking said detected register from said lists, altering a first code in said detected register to ineffectuate processing references to said detected register, linking said detected register to said isolation list for a predetermined time, deleting store references to said detected register during said predetermined time, and altering the codes of said detected register and the selected registers linked thereto to represent idle states of the devices corresponding to said selected registers at the end of said predetermined time.

8. In a switching system having a plurality of switching circuits and a common control comprising a plurality of items and a plurality of registers each assigned to one of said circuits, means for linking selected registers to coordinate the operation of circuits to which the selected registers are assigned, means for linking said registers onto a plurality of lists, means for detecting a distinct selected register, a method for initializing said distinct register comprising the processor performed steps of:

unlinking said detected register from said plurality of lists, altering said detected register to ineffectuate processing operations on said detected register, isolating said detected register from being linked to other registers for a predetermined time, deleting store items and register references to said detected register during said predetermined time, and modifying said detected register to correspond to a preassigned state at the end of said predetermined time.

9. In a telephone switching system having a plurality of circuits including trunk circuits and service circuits and a common control including a processor and a store, said store comprising a plurality of items, a plurality of trunk registers each assigned to one of said trunk circuits, and a plurality of service registers each assigned to one of said service circuits, means for linking a trunk register to selected service circuits, means for linking said trunk registers and service registers onto a plurality of lists whereby data corresponding to circuit signals are processed, means for detecting a trunk register having an error, and a list for isolating detected registers from said plurality of lists, a method for initializing a detected trunk register comprising the processor performed steps of:

unlinking said detected trunk register from said plurality of lists, altering said trunk register to ineffectuate processing references thereto, linking said trunk register to said isolation list for a predetermined time, deleting store items referring to said detected trunk register during said predetermined time, and altering said detected trunk register and said linked service registers to put said trunk circuit and said linked service circuits into idle states at the end of said predetermined time.

10. A data processing system comprising a plurality of peripheral devices, a processor and a store, said store comprising a plurality of registers each assigned to a distinct peripheral device and each comprising a plurality of codes, means for linking together a selected group of said registers for coordinating the operation of devices to which said group is assigned, said processor comprising means for detecting a distinct register in said group, and means for initializing said detected register comprising:

means for altering a first code in said detected register to ineffectuate processing references to said detected register, means responsive to the alteration of said first code for altering a second detected register code to isolate said detected register for a predetermined time, means responsive to the alteration of said second code for deleting references in said store to said detected register during said predetermined time, and means operative at the termination of said predetermined time for altering said detected register codes to represent an idle condition of the peripheral device to which said detected register is assigned.

11. In a telephone traffic service position switching system having a plurality of call processing circuits including trunk circuits connectable between a local office and a toll office and connectable to service circuits, a common control comprising a processor and a store, said store comprising a plurality of multicode registers each assigned to a call processing circuit including multicode registers assigned to trunk circuits and multicode registers assigned to service circuits, and a plurality of data codes, means for linking said trunk circuit registers into a plurality of lists for call processing by said processor, means for linking a trunk circuit register to selected service circuit registers, and means for detecting an error in one of said selected service circuit registers, a method for idling the trunk circuit linked to said service circuit register in which an error is detected comprising the processor performed steps of:

unlinking said trunk register from said plurality of call processing lists, altering said trunk register to ineffectuate call processing references thereto, isolating said trunk register from said plurality of call processing lists and said linked service circuit registers, deleting the data words in said store making reference to said trunk register, and altering said trunk register codes to put said trunk circuit to which the trunk register is assigned in an idle state.

* * * * *